United States Patent
Taycher et al.

(10) Patent No.: US 10,691,704 B2
(45) Date of Patent: Jun. 23, 2020

(54) DOMAIN-BASED SEARCH ENGINE

(71) Applicant: Kensho Technologies, LLC, Cambridge, MA (US)

(72) Inventors: Leonid Taycher, Newton, MA (US); Benjamin Cohen, Cambridge, MA (US); Predrag Gruevski, Cambridge, MA (US); Michael Shulman, Cambridge, MA (US)

(73) Assignee: Kensho Technologies, LLC, Cambridge, MA (US)

( * ) Notice: Subject to any disclaimer, the term of this patent is extended or adjusted under 35 U.S.C. 154(b) by 321 days.

(21) Appl. No.: 15/922,155

(22) Filed: Mar. 15, 2018

(65) Prior Publication Data

US 2019/0258723 A1 Aug. 22, 2019

Related U.S. Application Data

(60) Provisional application No. 62/633,389, filed on Feb. 21, 2018.

(51) Int. Cl.
| | |
|---|---|
| *G06F 16/30* | (2019.01) |
| *G06F 16/2457* | (2019.01) |
| *G06N 5/02* | (2006.01) |
| *G06F 16/248* | (2019.01) |

(52) U.S. Cl.
CPC ...... *G06F 16/24578* (2019.01); *G06F 16/248* (2019.01); *G06N 5/02* (2013.01)

(58) Field of Classification Search
CPC .............................. G06F 16/248; G06F 16/953
See application file for complete search history.

(56) References Cited

U.S. PATENT DOCUMENTS

| | | | |
|---|---|---|---|
| 8,402,094 B2 | 3/2013 | Bosworth et al. | |
| 8,489,641 B1* | 7/2013 | Seefeld | G06F 16/9537 707/792 |
| 9,727,617 B1 | 8/2017 | Segalis et al. | |
| 10,162,900 B1* | 12/2018 | Chatterjee | G06F 16/9535 |

(Continued)

OTHER PUBLICATIONS

Article entitled "Kensho: 'Google-like' search engine for financial analysis", by Jing, dated Apr. 4, 2017.*

(Continued)

*Primary Examiner* — Mahesh H Dwivedi
(74) *Attorney, Agent, or Firm* — Fish & Richardson P.C.

(57) ABSTRACT

This specification describes systems and methods for a domain-based search engine. One aspect of the invention provides a computer implemented method including: receiving a query that identifies an entity; identifying a domain that has the entity as a member; obtaining an entity-to-domain weight; identifying a precedent set connected to the domain; obtaining a precedent-set-to-domain weight; identifying an event in the precedent set; determining a score for the event based at least in part on (i) the entity to domain weight and (ii) the precedent set to domain weight; and providing rendering data for the event when the score satisfies a specified threshold. The rendering data can include a selectable link and the method can further include receiving a selection of the selectable link and in response to receiving the selection, providing rendering data that is indicative of an impact of the event on an entity.

20 Claims, 4 Drawing Sheets

(56) References Cited

U.S. PATENT DOCUMENTS

| | | | |
|---|---|---|---|
| 2012/0101807 A1 | 4/2012 | Heo et al. | |
| 2013/0018871 A1* | 1/2013 | Mehta | G06Q 10/00 |
| | | | 707/723 |
| 2014/0019240 A1 | 1/2014 | Zhou | |
| 2015/0331866 A1 | 11/2015 | Shen et al. | |
| 2016/0042071 A1 | 2/2016 | Ghosh et al. | |
| 2016/0055202 A1* | 2/2016 | Rosenburg | G06F 16/2423 |
| | | | 707/768 |
| 2016/0179805 A1* | 6/2016 | Bolshinsky | G06F 16/951 |
| | | | 707/723 |
| 2016/0321345 A1* | 11/2016 | Todic | G06F 16/248 |
| 2016/0371385 A1 | 12/2016 | Keysar et al. | |
| 2018/0150522 A1* | 5/2018 | Moskwinski | G06F 16/90335 |
| 2018/0247247 A1* | 8/2018 | Xu | G06Q 10/06393 |

OTHER PUBLICATIONS

Patent Cooperation Treaty (PCT), International Searching Authority, International Search Report and Written Opinion, PCT/US2018/023371, dated Nov. 20, 2018, 11 pages.

\* cited by examiner

DOMAIN-BASED SEARCH ENGINE

CROSS-REFERENCE TO RELATED APPLICATION

This application claims priority under 35 U.S.C. 119 to Provisional Application No. 62/633,389, filed Feb. 21, 2018, which is incorporated by reference.

This specification is related to search engines.

A search engine may generally be described as any program that executes a search and retrieves stored data. However, based on the task at hand, a search engine can be configured in a variety of different ways. For example, some search engines may be configured to perform keyword-based search and retrieval. Such search engines may identify relevant search results based, at least in part, on the number of times a search term appears in a particular resource, or the particular resource's metadata. Alternatively, or in addition, some search engines may identify relevant search results by identifying an entity name that is associated with one or more search terms, and then determining the number of occurrences of the entity name in one or more particular resources. In such instances, relevant search results may be obtained based on the number of occurrences of the entity name in the one or more particular resources. The aforementioned ways that a search engine can identify search results responsive to a query are merely exemplary.

However, the conventional methods for search and retrieval of data described above are not capable of identifying the most relevant data records for all search and retrieval operations. For example, in some instances, some of the most relevant search results may not include any keywords that match keywords of the received query. In such instances, for some applications, there is room for improvement of conventional search engines to facilitate identification and retrieval of data records that are relevant to a received query.

SUMMARY

This specification describes systems and methods for a domain-based search engine. According to one aspect, a system includes: one or more computers and one or more storage devices on which are stored instructions that are operable, when executed by the one or more computers, to cause the one or more computers to perform operations including: receiving a query that identifies an entity; identifying a domain that has the entity as a member; obtaining an entity-to-domain weight; identifying a precedent set connected to the domain; obtaining a precedent-set-to-domain weight; identifying an event in the precedent set; determining a score for the event based at least in part on (i) the entity to domain weight and (ii) the precedent set to domain weight; and providing rendering data for the event when the score satisfies a specified threshold.

Identifying a domain can include identifying a plurality of domains that each have the entity as a member and identifying a precedent set connected to the domain can include identifying a plurality of precedent sets each connected to at least one of the plurality of domains.

The entity can be a first entity and the operations can further include: identifying a second entity that is associated with the event; and providing second entity identification information for display. The second entity identification information can include an indication of the impact of the event on at least one of the first and second entity. Identifying an event in the precedent set can include identifying an event in the precedent set where the event has occurred within a specified time period. The specified time period can be a time period within the most recent single digit number of days, e.g., an event in the last day.

Receiving a query that identifies an entity can include receiving a query that identifies a non-human entity. Providing rendering data for the event when the score satisfies a first specified threshold can include providing rendering data for a selectable link associated with the event and the operations can further include receiving a selection of the selectable link; and in response to receiving the selection, providing rendering data that is indicative of the impact of the event.

According to another aspect described in this specification, a computer implemented method includes: receiving a query that identifies an entity; identifying a domain that has the entity as a member; obtaining an entity-to-domain weight; identifying a precedent set connected to the domain; obtaining a precedent-set-to-domain weight; identifying an event in the precedent set; determining a score for the event based at least in part on (i) the entity to domain weight and (ii) the precedent set to domain weight; and providing rendering data for the event when the score satisfies a specified threshold.

Identifying a domain can include identifying a plurality of domains that each have the entity as a member and identifying a precedent set connected to the domain can include identifying a plurality of precedent sets each connected to at least one of the plurality of domains. The entity can be a first entity and the method can further include: identifying a second entity that is associated with the event; and providing second entity identification information for display.

The second entity identification information can include an indication of the impact of the event on at least one of the first and second entity. Identifying an event in the precedent set can include identifying an event in the precedent set that has occurred within a specified time period. The specified time period can be a time period within the most recent single digit number of days, e.g., within the past day.

Receiving a query that identifies an entity can include receiving a query that identifies a non-human entity. Providing rendering data for the event when the score satisfies a first specified threshold can include providing rendering data for a selectable link associated with the event and the method can further include receiving a selection of the selectable link; and in response to receiving the selection, providing rendering data that is indicative of the impact of the event. Identifying a domain that has the entity as a member can include: identifying a domain that has an entity-to-domain weight that satisfies a second predetermined threshold.

According to another aspect described in this specification, a computer implemented method includes: receiving a query that identifies an entity; identifying domains that have the entity as a member; obtaining entity-to-domain weights for each identified domain; identifying precedent sets, each identified precedent set being connected with at least one of the domains; obtaining a precedent-set-to-domain weight for each identified precedent set; identifying events that are part of at least one of the identified precedent sets; determining a score for each identified event based at least in part on (i) an obtained entity to domain weight and (ii) an obtained precedent set to domain weight; and providing rendering data for an identified event when the score for the identified event satisfies a specified threshold.

The entity can be a first entity and the method can further include: identifying a second entity that is associated with an identified domain; and providing second entity identification information for display. The second entity identification information can include an indication of the impact of the event on the second entity.

The present disclosure provides multiple advantages over conventional methods. For example, the present disclosure can identify relevant information that conventional search engines cannot. In addition, the present disclosure provides performance gains because the search engine of the present disclosure operates as a single search unit, regardless of the number of one or more components centralized or distributed components of which the present disclosure is comprised of. In contrast, conventional solutions would require multiple different units that generate their own output for analysis. For example, conventional methods may use a separate apparatus capable of executing multiple queries to define precedents, a separate apparatus capable of executing multiple queries to identify entities, a separate apparatus capable of calculating the impact of a given entity on a domain or a given precedent on a domain, and the like. Then, a person would need to determine how queries from each of the respective apparatus are connected. Each step of this process that may include additional input checks and analysis. Each apparatus would require separate queries, and second separate apparatus for each query would introduce losses in performance, losses in accuracy from possible human error, and separate-component error, and when speed is of the essence (such as, for example, running a query on a set of variables that are frequently changing over time), fast and accurate execution using a single search tool without the loss incurred in switching between different tools is advantageous.

The present disclosure also provides gains in efficiency. The present disclosure provides for domain-based searching by use of a single search query. In contrast, conventional systems would require that an individual execute multiple queries on multiple apparatuses and define connections between those various apparatuses. Use of multiple queries and multiple apparatuses introduces human inefficiencies, machine inefficiencies, and outcome inefficiencies for multiple reasons. First, use of the domain-based search tool of the present disclosure instead of multiple different conventional tools avoids duplicating work that may be performed using conventional apparatuses to identify the particular apparatus of multiple different apparatus that need to be used to receive a query and provide a relevant response to the query. For example, if a particular objective requires 5 queries, requiring execution of one query each on five different conventional apparatuses, it may take many more queries than just 5 total queries to get the right results, as it is likely that it may take multiple queries on each apparatus to get the result one is looking for. Efficiency gains by using the single domain-based search tool of the present disclosure can be achieved with respect to user time, user input, as well as a reduction in hardware resources as use of duplicative resources (e.g., storing the same data on different apparatuses, running partially the same date and thread on different apparatuses, running queries multiple times). Accordingly the domain-based search tool of the present disclosure reduces memory needs, storage needs, electricity needs, and in avoiding duplicative work and reducing errors from combining multiple queries, the domain based search tool described in this specification reduces the resources it takes to run such multiple queries.

DETAILED DESCRIPTION

Figure 1A:
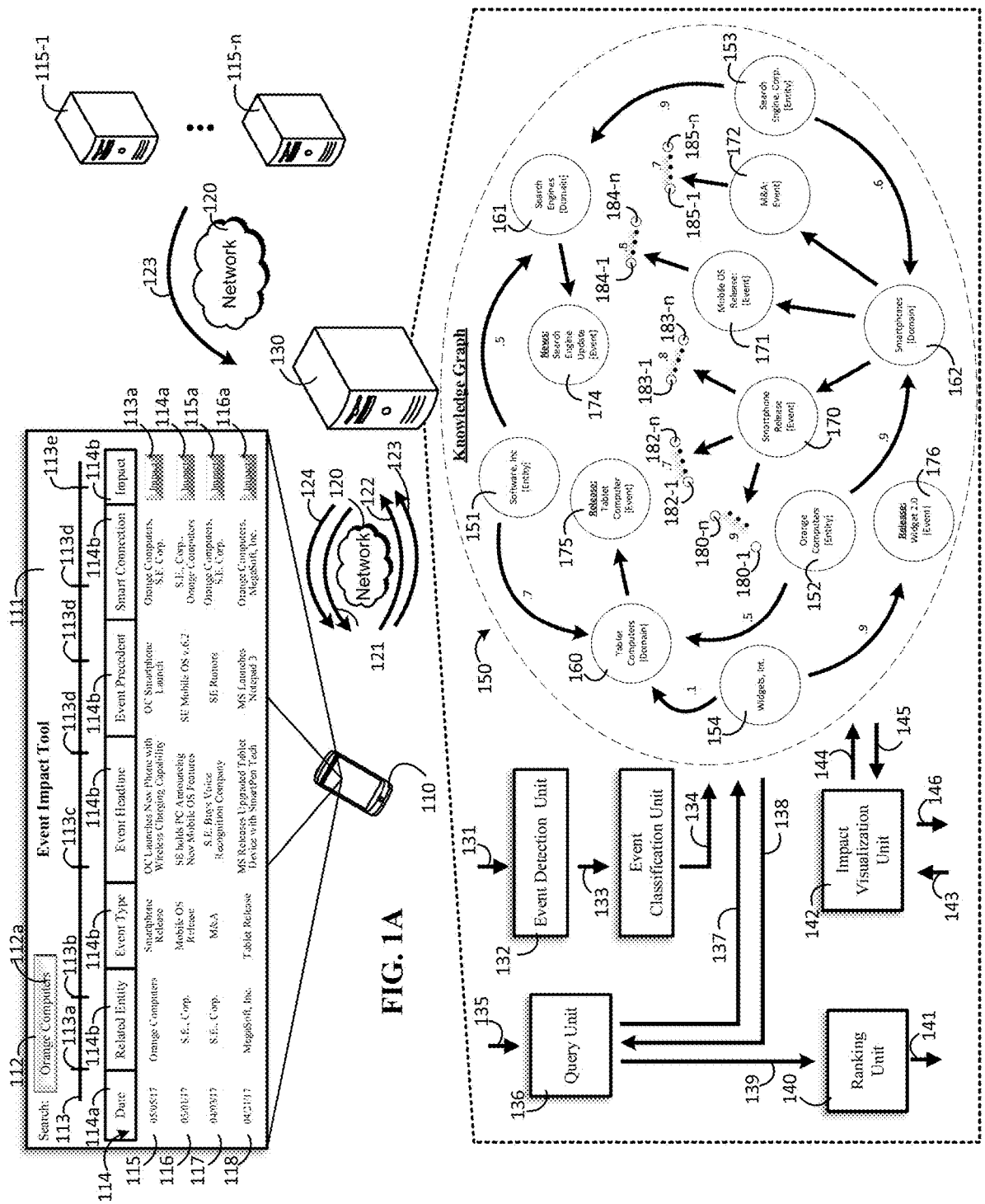
FIG. 1A is an example of a domain-based search system.

FIG. 1A is an example of a domain-based search system 100. The domain-based search system 100 includes a user device 110, one or more feed servers 115-1 to 115-n, a network 120, and a server 130.

The server 130 includes an event detection unit 132, an event classification unit 133, a query unit 136, a ranking unit 140, and an impact visualization unit 142. The server 130 is configured to receive real-time data feeds 123 provided by the one or more feed servers 115-1 to 115-n via the network 120. Real-time data feeds may include real-time data feeds or near-real time data feeds. The network 120 may include, for example, one or more of a LAN, a WAN, a cellular network, the Internet, or a combination thereof. The real-time data feeds may include one or more data records representing data such as news headlines, news articles, social media posts, blog posts, notifications, or the like that can describe an event related to a first entity. An entity can include, e.g., a company, a government agency, a government official, an asset such as a financial asset or security, an event, a media content item, a country, a state, or a city. In certain aspects described in this specification, an entity does not include a human person, or a profile representing a human person. The real-time feeds may include structured information, unstructured information, or a combination thereof. The server 130 may provide 131 the received real-time data feeds to an event detection unit 132.

The event detection unit 132 is configured to analyze the real-time data feeds and detect the occurrence of one or more events. An event may include, for example, a product release, a public announcement by an entity, a merger or acquisition by an entity, a merger or acquisition of an entity, new articles related to an entity, or the like. The event detection unit 132 can analyze the text, images, and video associated with the real-time data feed in order to identify event classification data such as an event type, classifying the event in one or more precedent sets, an entity name that is associated with the event, or a combination thereof. In some implementations, the event classification data may be identified by searching the incoming set of data records in the real-time data feed for one or more known event identifiers, domain identifiers, entity identifiers, or the like to search received real-time data records.

The event classification unit 134 can be used to classify a detected occurrence of an event using the knowledge graph 150. Classifying the detected occurrence of an event may include, for example, generating a new node of the knowledge graph that represents the detected occurrence of the event. In addition, classifying the detected occurrence of an event may include, for example, inserting the newly generated node into an appropriate position in the knowledge graph hierarchy. The appropriate position in the knowledge graph hierarchy where the newly generated node should be added may be determined based on the identified event classification data that is associated with the event that is represented by the newly generated node. The identified event classification data may include, for example, an entity identifier, event domain, an event type, or the like.

The event classification unit 134 may store the newly generated node in the knowledge graph 150 as an event precedent node such as event precedent node 180-1 to 180-$n$ also referred to as a precedent set. An event precedent node such as an event precedent node 180-1 to 180-$n$ (where n is any positive integer) may include data describing a particular event such as an event type, a particular entity that is associated with the event, a date of the particular event or, a combination thereof. In some implementations, the data maintained by an event precedent node can be used to search a database of historical data associated with one or more respective entities. For example, the historical data may include historical data, for one or more respective entities, such as historical popularity ratings, sales data, revenue data, profit data, debt data, financial asset data (e.g., entity stock price or entity bond price), or a combination thereof. Such historical data may be mined using event precedent data to predict an entity's response to the event. For example, one or more queries may be generated and executed to predict movement in the value of a second entity's financial asset in response to a first entity's event.

The knowledge graph 150 is a data structure that can be used to store relationships that exist between entities. At a particular point in time t the knowledge graph 150 may be initialized to include: (i) an initial set of entity nodes such as entity nodes 151, 152, 153, 154; (ii) an initial set of domain nodes such as domain nodes 160, 161, 162; (iii) an initial set of event nodes such as event nodes 170, 171, 172, 173, 174, 175, 176; (iv) an initial set of event precedent nodes such as event precedent nodes 180-1 to 180-$n$; and (v) an initial set of relationships between one or more respective pairs of nodes. Each respective relationship is shown in FIG. 1A using an arrow between certain pairs of nodes. Beyond time t the system 130 may analyze, from time to time, 1) real-time data feeds to discover one or more new nodes for inclusion in the graph 150, and 2) one or more new relationships between an existing node of the knowledge graph 150. The knowledge graph 150 shown in FIG. 1A is an example of at least a portion of a knowledge graph that can be employed by system. As described more fully below, the system can be executed in a variety of computational settings including in one or more servers The knowledge graph 150 is implemented using a directed graph that can be organized to include layers of different types of data nodes. For example, the knowledge graph 150 may include one or more layers of entity nodes 151, 153, 154, one or more layers of domain nodes 160, 161, 162, 163, one or more layers of event nodes 170, 171, 172, 173, 174, 175, 176, and one or more layers of event precedent nodes 180-1 to 180-$n$. The edges of the directed graph are used to establish relationships between two or more respective nodes of the graph.

In some implementations, the knowledge graph 150 may be organized in a manner that includes a plurality of root nodes that are each associated with a particular entity. For example, the knowledge graph 150 may include a first root entity node 151 that is associated with an entity "Software, Inc.," a second root entity node 152 that is associated with an entity "Orange Computers," a third root entity node 153 that is associated with an entity "Search Engine, Corp.," and a fourth root entity node 154 that is associated with a fourth entity "Widgets, Inc." A root entity node may be associated with a particular entity if, for example, the root entity node represents the entity. A root entity node may be associated with a particular entity if, for example, the root entity node can be used to identify an attribute related to the particular entity. For example, the root entity node 151 is associated with the particular entity "Software, Inc." because the root entity node 151 identifies the name of the particular entity. Alternatively, or in addition, a root entity node may be associated with a particular entity if, for example, one or more graph edges extend from the root entity node to another node of the knowledge graph 150 in a manner that defines an attribute of the particular entity. For example, a root entity node 151 is associated with the particular entity "Software, Inc." because graph edges establish a relationship between "Software, Inc." and one or more domain nodes 160, 161.

The knowledge graph 150 also includes multiple domain nodes 160, 161, 162, 163. Domain nodes can be used by the knowledge graph 150 to establish a common relationship between two or more root entity nodes 151, 152, 153. A domain may include an attribute. For example, a domain may include an entity characteristic, an entity activity, or a geographic region associated with the entity. In some implementations, a domain may include a product line (or genre) that an entity produces, a business practice that an entity is engaged in, or a technological field associated with the entity. Graph edges of the knowledge graph 150 that extend from an root entity node 150, 151, 152, 153, 154 to a domain node 160, 161, 162, 163 establish an identifiable relationship between an entity associated with a root entity node and one or more domains. The relationship is an identifiable relationship because the relationship can be identified using a search query. For example, in response to a search query for the entity name "Software, Inc.," the server 130 can determine that the entity "Software, Inc." is associated with the domains of "Tablet Computers" 160 and "Search Engines" 161. In this manner, the server 130 can indirectly determine the domains associated with an entity name included as a parameter of a search query by identifying a root entity node 151, 152, 153, 154 corresponding to the entity name, and traversing one or more edges of knowledge graph 150 to one or more domain nodes 160, 161, 162, 163.

An entity-to-domain weight can be used to describe the relationship between a root entity node 151, 152, 153, 154 and a domain node 160, 161, 162, 163, 164. Entity-to-domain weights are shown in FIG. 1A on each edge between an entity node and a domain node. By way of example, the entity-to-domain weight between entity node 152 "Orange Computers" and the domain node 162 "Smartphones" is 0.9. The entity-to-domain weight may include, for example, a numerical value (e.g., 0.9) that represents the relationship between the entity node such as Orange Computers 152 and the domain node 153. In some implementations, the relationship that is represented by the numerical value may include the impact (e.g., importance) of the entity to the domain, the impact (e.g., importance) of the domain to the entity, or a combination thereof. The numerical value may include, for example, a number between zero and one, with zero indicating that the entity has no impact on the domain and one indicating that the entity has complete impact over the domain. By way of example, the entity-to-domain weight for the entity "Widgets, Int." 154 and domain "Tablet Computers" 160 is a low "0.1" because the entity "Widgets, Int." 154 does not have a strong relationship to the "Tablet Computers" 160 domain. This is because, e.g., "Widgets, Int" 154 does not derive more than a threshold amount of revenue from the domain "Tablet Computers" 160.

In some implementations, the entity-to-domain weight for each of the one or more domains may be determined using an index of entities (e.g., corporations, companies, or persons) that are associated with the domain. Each entity in the index of entities may be weighted based on the magnitude of the respective entity's contribution to the domain. The entity's contribution to the domain may be represented using the value of one or more company characteristics. By way of example, if the entities in the index of entities are companies or corporations, the weight for the entity in the index may be a rank that is based on how much value each respective company or corporation obtains from the relevant domain. The system can monitor the movement of entities within the each index and adjust entity-to-domain weights based on the entity movements. A movement may include, for example, movement of an entity within an index based on the entity's change in rank within the index. The information such as value that is issued to rank the entities in the index of entities may be obtained from publicly filed financial documents.

However, the present disclosure should not be limited to ranking entities in an index of entities based on value. Other types of entity characteristics may include, for example, a number of the times the entity's name has appeared in the news within a particular period of time (e.g., number of news mentions within the last week) in relation to the domain. In some implementations, a particular domain may be provided and occurrences of entity names in relation to that domain can be counted. In some implementations, the entity-to-domain weight may be established as a probability. For example, the system may determine a number of occurrences of an entity's name in the media in relation to a particular domain vs. the total number of occurrences of the entity's name in the media.

After identifying an entity in response to a user query, the system 100 can identify an entity-to-domain weight for each domain associated with the entity. In some implementations, the entity-to-domain weight may be associated with the edge of a graph data structure that links the entity to the domain in the knowledge graph. Identifying the entity-to-domain weight for each domain associated with the entity may include, for example, accessing the knowledge graph and obtaining the entity-to-domain weight for each graph edge that extends from an entity to a domain and that has a weight above a specified threshold.

In some implementations, a knowledge graph such as knowledge graph 150 may include one or more domain nodes that are not yet associated with one or more root entity nodes. In addition, additional domains may be discovered and new domain nodes may be generated and added to the knowledge graph 150 based on the processing of real-time event data.

The knowledge graph 150 also includes multiple event nodes 170, 171, 172, 173, 174, 175, 176. Event nodes may include, for example, nodes representing a specific type (or category) of event that is associated with a particular domain. Each specific type (or category) of event may be associated with at least an event identifier and an entity name that is associated with the event. The event identifier and the event name may be referred to as an event-entity pair. For example, a knowledge graph 150 may include a plurality of events in the "Smartphone" domain that include a node 170 corresponding to (i) a release of a new Orange Computer smartphone, (ii) a release of a new update to Search Engine, Inc. mobile operating system (OS), (iii) information related to a Search Engine, Inc. acquisition of another entity that provides Voice Recognition technology, or (iii) news reports of a product or service announcement launched by Orange Computers.

One or more event nodes 170, 171, 172, 173 may become associated with a particular domain such as the "Smartphones" domain by creating a plurality of graph edges each of which (i) is associated with the "Smartphone" domain node 162 and (ii) references one or more of the respective event nodes 170, 171, 172, 173. Each respective graph edge may be associated with a score, weight, or other value that provides an indication of the impact that the event has on the one or more entities in the domain. For example, edges that reference significant events such as a release of a new Orange computers smartphone, a release of a new Search Engine, Inc. mobile operating system update, or the like may be determined to have a greater impact on entities in the "Smartphone" domain. Such events may be determined to have a significant impact on all of the entities associated with the "Smartphone" domain, or only some of the entities associated with the "Smartphone" domain. For example, Orange Computers may be known as a market leader in the "Smartphone" domain. In such instances, a release of an Orange computers smartphone can have a significant impact on other entities associated with the "Smartphone" domain. Accordingly, such edges may be associated with a higher weight, such as 0.8 and 0.9, where the weight is normalized on a scale of 0 to 1 with 1 indicating the largest weight. On the other hand, edges that reference less significant events such as Orange Computers announcing the introduction of a new pair of earbuds may be a less significant impact on entities in the "Smartphone" domain. For example, Orange Computer's announcement that they introducing a new pair of earbuds may not have a significant impact on S.E. Corp. because S.E. Corp. does not rely sale of earbuds to generate significant amounts of S.E. Corp.'s revenue, profits, growth, or the like. The impact of the event on one or more other entities in the same domain may be based on a variety of factors including, for example, (i) the importance of the domain to the entity associated with the event, (ii) the importance of the entity associated with the event to the domain, or (iii) a combination thereof. In some implementations, one or more events may be selected in response to a search query identifying an entity based on the impact score. Alternatively, or in addition, the impact score may be used to rank one or more records provided in response to a search query identifying an entity.

In some implementations, a knowledge graph such as knowledge graph 150 may include one or more event nodes that are not yet associated with one or more domain nodes. Furthermore, additional events may be discovered and new event nodes may be generated and added to the knowledge graph 150 based on the processing of real-time event data.

The knowledge graph 150 also includes one or more event precedent nodes 180-1 to 180-$n$, where n is any non-zero integer greater than one. Event precedent nodes may include, for example, data representing a particular event that has occurred at some point in time prior to a current time t. An event precedent node such as event precedent node 180-1 to 180-$n$ is a node that includes data describing a particular event. Data describing a particular event may include, an event type, a particular entity that is associated with the event, or a combination thereof. Each event precedent node may be associated with a particular event node. One or more event precedent nodes 180-1 to 180-$n$ may become associated with a particular event node such as a specific "Smartphone Release" event node 170 by creating a respective graph edge that is associated with the specific "Smartphone Release" event node 170 and references a respective event precedent node 180-1 to 180-$n$ for smartphone releases generally.

The server 130 may access an event precedent node such as an event precedent node 180-1 in response to an entity query. Accessing an event precedent node may include, for example, obtaining one or more data items that event precedent node uses to describe an event. For example, the server 130 may access an event type and a particular entity associated with the event in response to a query from a user identifying an entity. Accessing an event precedent node may also include obtaining the date that is associated with the event precedent node. Processing of a received query is described further below.

In some implementations, a user may input a search query 112a into a search box 112 of a user interface 111 provided for display on the user device 110. In some implementations, the search query 112a may identify an entity. For example, the search query 112a may include one or more parameters such as the entity name "Orange Computers." The user device 110 may transmit 122 the search query 112a to server 130 via network 120 in response to an instruction to submit the search query 112a from a user of the user device 112a. The query unit 136 may receive 135 and process the search query 112a in an effort to obtain one or more data records from the knowledge graph 150 that can be provided for display on the user interface 111 in response to the received search query 112a. Processing the received search query 112a may include the query unit 135 accessing 137 the knowledge graph 150 to obtain one or more data records based on the content of the received query.

By way of example, with reference to FIG. 1A, the query unit 136 may begin performing a domain-based search query by accessing 137 the knowledge graph 150 and identifying one or more root entity nodes that correspond to the received query "Orange Computers." In this example, the query unit 136 can identify the root entity node 152 corresponding to the search parameter "Orange Computers." Then, the query unit 136 may traverse each respective graph edge associated with the identified root entity node 152 to determine the respective domain nodes 160 and 162 that are associated with the root entity node "Orange Computers." In this example, the identified domain nodes 160 and 162 correspond to the "Tablet Computer" domain and the "Smartphone" domain.

The query unit 136 can continue processing of the received query by identifying one or more events that are associated with the identified domains 160 and 162. Events can be identified by identifying domains that are related to the entity, identifying precedent sets that are related to the identified domains and then identifying recent events that are part of the identified precedent sets. Identifying one or more events may include, for example, identifying one or more event nodes that are associated with the identified domain nodes. In the example of FIG. 1, this may include identifying entity nodes 170, 171, 172, 173, 175. Alternatively, for example, this may include identifying only a subset of the event nodes that have an impact score that satisfies a predetermined threshold. In the example of FIG. 1, this may include identifying only those event nodes that are associated with an impact score greater than 0.5. In such instances, this would include identifying only the event nodes 170, 171, 175 in response to the received query.

The query unit 136 can access data associated with one or more event nodes 170, 171, 172, 173, 175 that are associated with a domain that is related to a root entity node responsive to the received query 112a. The accessed data may include, among other things, for example, an event-entity pair. An event-entity pair associated with the event node 170 may include Smartphone Release-Orange Computers, an event-entity pair associated with the event node 171 may include Mobile OS Update-Search Engine, Inc., an event-entity pair associated with the event node 172 may include Acquisition of Voice Recognition Company-Search Engine, Inc., an event-entity pair associated with the event node 173 may include Announcement of New Earbuds-Orange Computers, and an event-entity pair associated with the event node 175 may include Tablet Release-Orange Computers. The query unit 136 may use each respective event-entity pair to obtain one or more data records associated with each event identified by the respective event-entity pairs. The obtained data records may be obtained from historical data and include a date of the event, an entity related to the event, an event type, an event headline, an event precedent, one or more smart connections, the domain of the event, or a combination thereof. The obtained data records may be returned to the query unit 138 and provided 139 to the ranking unit 141 (indirectly from the query unit 136 or directly from the knowledge graph).

The ranking unit 140 may process the obtained data records to generate an ordered set of search results that can be provided for display on the user interface 111. Processing the obtained data records may include ordering the obtain data records based on one or more ranking scores. In one implementation, the ranking unit 140 may rank the obtained data records based on the impact score associated with each obtained data record. Alternatively, or in addition, the ranking unit 140 may select a subset of the obtained data records for display on the user interface 111 based on impact score that is associated with each of the obtained data records. The ordered set of data records output 141 by the ranking unit 140 may be transmitted 121 by the server 130 for display on the user interface 111 in the order determined by the ranking unit 140.

The user interface 111 may include a search input box 112 (described above), a timeline 113, and grid 114 of information. The timeline 113 may include a plurality of graphical icons 113a, 113b, 113c, 113d, 113e that each correspond to a particular event associated with the entity identified in the search query 112a. The timeline 113 may be interactive. For example, a user may select one or more graphical icons of the plurality of graphical icons 113a, 113b, 113c, 113d, 113e and, in response to the selection of the graphical icon, the user interface 111 may highlight the domain-based search result in the grid 114 of information that corresponds to the selected graphical icon. If the domain-based search result corresponding to the selected graphical icon is not positioned in the visible portion of the user interface 111, then the user device 110 may dynamically scroll the user interface to the portion of the domain-based search results where the corresponding domain-based search result is positioned. The grid 114 of information can include an organized view of the obtained and ordered data records identified based on the domain-based search that can include a date of the event 114a, an entity that is related to the event 114b, an event type 114c, an event headline 114b, an event precedent 114b, one or more smart connections 114b, and a request for impact information 114b. The grid 114 can also include the domain of the event. The data from each obtained and ordered data record may be presented in each respective row of the grid of information as a domain-based search result. For example, each respective domain-based search result 115, 116, 117, 118, 119 may correspond to a particular obtained data record from the plurality of obtained data records that were identified during the domain-based search.

The user interface 111 provides the domain-based search results 115, 116, 117, 118, 119 in a manner that allows a user to easily mine the knowledge graph 150 to determine the impact of one or more identified events. For example, the domain-based search result 115 identifies an Orange Computers event where Orange Computers launched a new Smartphone. The domain-based search result 115 further identifies in the smart connection 114*b* column that the event is related to entities Orange Computers and Search Engine, Inc. The system determines that the Search Engine, Inc. is a smart connection to the event based at least in part on 1) the event's precedent set to domain weight and 2) the domain to entity weight. The domain-based search result allows the user to mine the knowledge graph 150 for impact of this Orange Computer event on Search Engine, Inc. using the "Impact" selectable icon 113*a*.

In response to a user selection of the "Impact" selectable icon 113*a*, the user device 110 may transmit 123 a subsequent query to the server 130 to determine the impact of the Orange Computer smartphone launch on Search Engine, Inc. The subsequent query may include one or more parameters associated with the domain-based search result 115. The "Impact" may include data that describes a change in one or more attributes associated with the Search Engine, Inc. since the occurrence of the Orange Computer smartphone launch event. The change in one or more attributes may include, for example, a change in Search Engine, Inc.'s popularity, revenue, profitability, financial asset price, or the like. The data describing change in one or more Search Engine, Inc. attributes may be obtained based on an additional search of the knowledge graph 150.

The subsequent search query may be provided 143 as an input to the impact visualization unit 142. The impact visualization unit 142 may generate a query based on the data included in the subsequent search query. For example, the impact visualization unit 142 may generate a query that includes the entity related to the event (e.g., Orange Computers), the domain associated with the event (e.g., Smartphones), and event precedent (e.g., Orange Computers Smartphone launch). The query may be used to mine the knowledge graph 150 to identify one or more event precedent nodes 180-1 to 180-*n* that are associated with Orange Computers Smartphone launches. For example, the impact visualization unit 142 may identify a root entity node based on the entity that is related to the event (e.g., Orange Computers), navigate the edges of the knowledge graph 150 to the domain that is related to the event (e.g., Smartphones), and navigate to the event that is associated with the event precedent (e.g., OC Smartphone launch). The impact visualization unit 142 may then identify each event precedent node 180-1 to 180-*n* that is associated with the event node 170. Then, the impact visualization unit 180-1 to 180-*n* may access and obtain 145 the event data associated with each respective precedent node 180-1 to 180-*n* and use the accessed event data to search one or more historical databases related to the Smart Connection's (e.g., Orange Computer's and Search Engine, Inc.'s) response to Orange Computer's event.

For example, the impact visualization unit 142 may search one or more databases for data corresponding to one or more Orange Computer attributes such as financial asset price movement based on an event date for each Orange Computer Smartphone launch event. Alternatively, or in addition, the impact visualization unit 142 may search one or more historical database for data corresponding to one or more Search Engine Inc. attributes such as financial asset price movement based on an event data for each Orange Computer Smartphone launch event. The impact visualization unit 142 may then generate rendering data for display on the user interface 111 of the user device 110 that juxtaposes the response of the Orange Computer's attribute and Search Engine Inc.'s attribute from the date of the Orange Computer Smartphone launch event. For example, the impact visualization unit 142 may generate rendering data that can be used to render a first chart showing the value of Orange Computer's asset juxtaposed with the value of Search Engine, Inc.'s asset from a time of t=the date of the Orange Computer Smartphone launch event. The generated rendering data may be transmitted 124 by the server 130 to the user device 110 via the network 120 for display on a user interface of the user device. A user may then evaluate the data rendered on the display of the user device to determine the impact of the Orange Computer Smartphone event on both the value of Orange Computer's and Search Engine, Inc.'s respective assets.

Figure 1B:
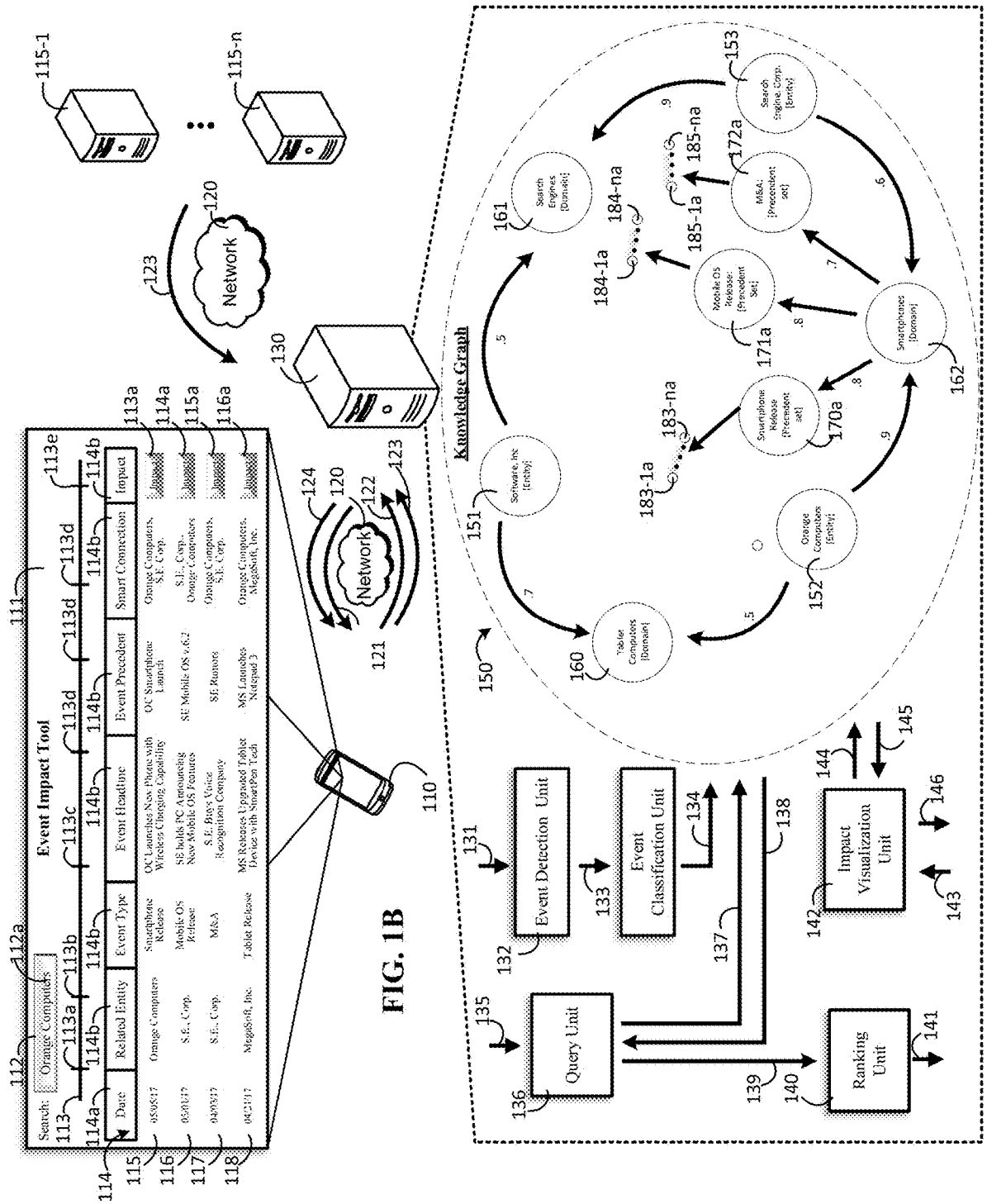
FIG. 1B is another example of a domain-based search system.

FIG. 1B is an illustration of a domain-based search system as shown in FIG. 1A but with a different depiction of the knowledge graph 150. As in FIG. 1A, an entity e.g., entity node 152, is connected by a weight, e.g., by an edge weight such as a 0.9 edge weight, to a domain, e.g., domain node 162. FIG. 1B further shows that a domain, e.g., domain node 162, can be connected by a weight, e.g., by an edge weight such a 0.8 edge weight, to a precedent set 170*a*, e.g., precedent set node 170*a*. A precedent set, e.g., precedent set 170*a*, can include a recent event, e.g., event 180-1*a*. In a further refinement, there can be a weighting to reflect how connected a particular event is to a precedent set.

The examples of FIGS. 1A and 1B are described as using the system 100 to provide domain-based search results in response to a search for a first entity such as "Orange Computers" and to determine an impact of a first entity's event on a second entity such as "Search Engine, Inc." However, the present disclosure need not be so limited. For example, the system 100 can be used to predict the impact of an event on one or more entities. Alternatively, or in addition, the system can be used to provide a user with insight as to why an event had a particular impact on an entity.

Figure 2:
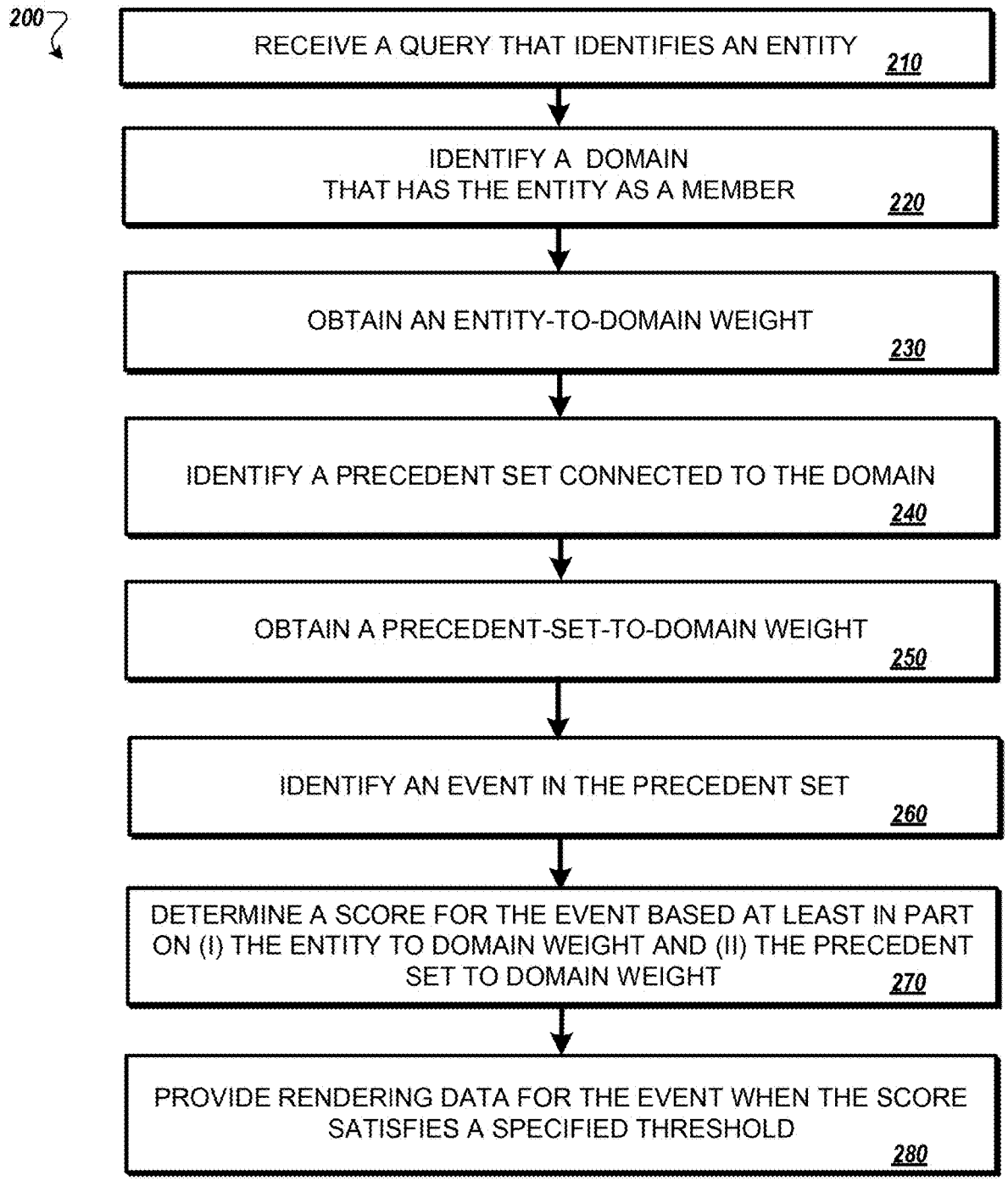
FIG. 2 is a flowchart of an example of a process for executing a search using a domain-based search system.

FIG. 2 is a flowchart of an example of a process 200 for executing a search using a domain-based search system. Generally, the process 200 includes: receiving a query that identifies an entity (210), identifying one or more domains that has the entity as a member (220), obtaining an entity-to-domain weight (230), identifying a precedent set connected to the domain (240), obtaining a precedent set to domain weight (250), identifying an event in the precedent set (260), determining a score for the event based at least in part on (i) the entity-to-domain weight and (ii) the precedent-set-to-domain weight (270), and providing rendering data for the event when the score satisfies a specified threshold (280). For context, the process 200 will be describe below as being performed by a system such as the system 100 of FIG. 1.

As noted above, a system can receive 210 a query from which a first entity the system can identify an entity. For example, the system may receive a query that includes an entity name such as a company named "Orange Computers." However, the present disclosure need not be limited to a system that receives a query that includes an entity name that refers to a company name. Instead, the system can receive a query that identifies a different type of entity such as corporation, a government agency, a government official, a financial asset, a financial security, an event, a media content item, a country, a state, a city, or an entity profile.

The system can identify 220 one or more domains that has the entity as a member. Identifying one or more domains that are associated with the first entity may include accessing a knowledge graph that defines relationships between a plurality of entity nodes, domain nodes, and precedent sets. The system can use the knowledge graph to identify an entity node that corresponds to the first entity that is identified in the query received at stage 210. Once the entity node corresponding to the first entity is identified, the system can then identify one or more domains associated with the first entity by traversing each graph edge that extends from the entity node to each of a plurality of domain nodes.

The system can obtain 230 an entity-to-domain weight. In some implementations, the entity-to-domain weight may be associated with the edge of a graph data structure that links the entity to the domain in the knowledge graph. Identifying the entity-to-domain weight for each domain associated with the entity may include, for example, accessing the knowledge graph and obtaining the entity-to-domain weight for each graph edge that extends from an entity node to each domain that is connected to the entity. The entity-to-domain weight may include, for example, a numerical value that represents the relationship between the entity and the domain. In some implementations, the relationship that is represented by the numerical value may include the impact (e.g., importance) of the entity to the domain, the impact (e.g., importance) of the domain to the entity, or a combination thereof. The numerical value may include, for example, a number between zero and one, with zero indicating that the entity has no impact on the domain and one indicating that the entity has complete impact over the domain.

The system can identify 240 a precedent set connected to the domain, for example, by following edges from identified domains that lead to precedent sets, as illustrated in FIG. 1B. The system can obtain 250 a precedent set to domain weight for example by extracting the weight associated with an edge connecting an identified domain node and an identified precedent set. The precedent-set-to-domain weight for each of the one or more precedent sets include a numerical representation of the relationship between each particular precedent-set to each of the respective domains with which the precedent-set is associated. A precedent-set may be associated with a domain if there exists a path through the knowledge graph from a domain to the precedent-set using one or more graph edges that pass from a domain node to the precedent-set through one or more events. The relationship between a precedent-set and a domain may include data describing the impact (or importance) of the precedents in a particular precedent-set and the domain. In some implementations, the relationship that may be represented by the numerical value may include the impact (e.g., importance) of the precedents in the precedent-set to the domain, the impact (e.g., importance) of the domain to the precedents in the precedent-set, or a combination thereof. The numerical value may include, for example, a number between zero and one, with "0" indicating that the precedents in the precedent set have no impact on the domain and "1" indicating that the precedents in the precedent-set have complete impact on the domain.

In some implementations, the precedent-set-to-domain weight for each of the one or more precedent sets may be determined using an index of entities (e.g., corporations, companies, or persons) that are associated with the domain. Each entity in the index of entities may be weighted based on the magnitude of the respective entity's contribution to the domain. The entity's contribute to the domain may be represented using the value of one or more company characteristics that relate to the precedent-set. By way of example, if the entities in the index of entities are companies or corporations, the weight for the entity in the index may be a rank that is based on how much revenue each respective company or corporation obtains from the relevant domain in connection with the occurrences of precedents in the precedent-set. The system can monitor the movement of entities within the each index of each precedent-set in connection with the occurrence of precedent events and adjust precedent-set-to-domain weights based on the entity movements. A movement may include, for example, movement of an entity within an index based on the entity's change in rank within the index. The information such as value that is used to rank the entities in the index of entities may be obtained from publicly filed financial documents.

However, the present disclosure should not be limited to ranking entities in an index of entities based on value. Other types of entity characteristics may include, for example, a number of the times the entity's name has appeared in the news within a particular period of time (e.g., number of news mentions within the last week). In some implementations, the system may count a number of appearances of the entity's name within a particular period of time with respect to a particular domain. In some implementations, a particular domain may be provided and occurrences of entity names in relation to that domain can be counted. In other implementations, the system may count the number of occurrences of a precedent set to the given domain. In some implementations, the precedent-set-to-domain weight may be established as a probability. For example, the system may determine a number of occurrences of an entity's name in the media in relation to a particular domain vs. the total number of occurrences of the entity's name in the media.

The system can identify 260 an event in the precedent set, for example by searching for event nodes connected to a precedent set node in the graph. More generally, the system can search for recent events that exist in the identified precedent sets.

The system can determine 270 a score for the event based at least in part on (i) the entity-to-domain weight and (ii) the precedent-set-to-domain weight. The ranking score may include, for example, any mathematical combination of the entity-to-domain weight and the precedent-set-to-domain weight. In some implementations, the mathematical combination of the entity-to-domain weight may include a weighted combination of the entity-to-domain weight and the precedent-set-to-domain weight. In some implementations, the entity-to-domain weight may be used to scale the precedent-set-to domain weight. For example, the precedent-set-to-domain weight may be used to adjusted based on the entity-to-domain weights. In such instances, the adjusted precedent-set-to-domain weight may be used as the ranking score for the one or more events.

The system can provide 280 rendering data for the event when the score satisfies a specified threshold. For example, each event that is associated with a domain identified responsive to the query and associated with a score that exceeds a specified threshold may be provided in response to the received query.

Figure 3:
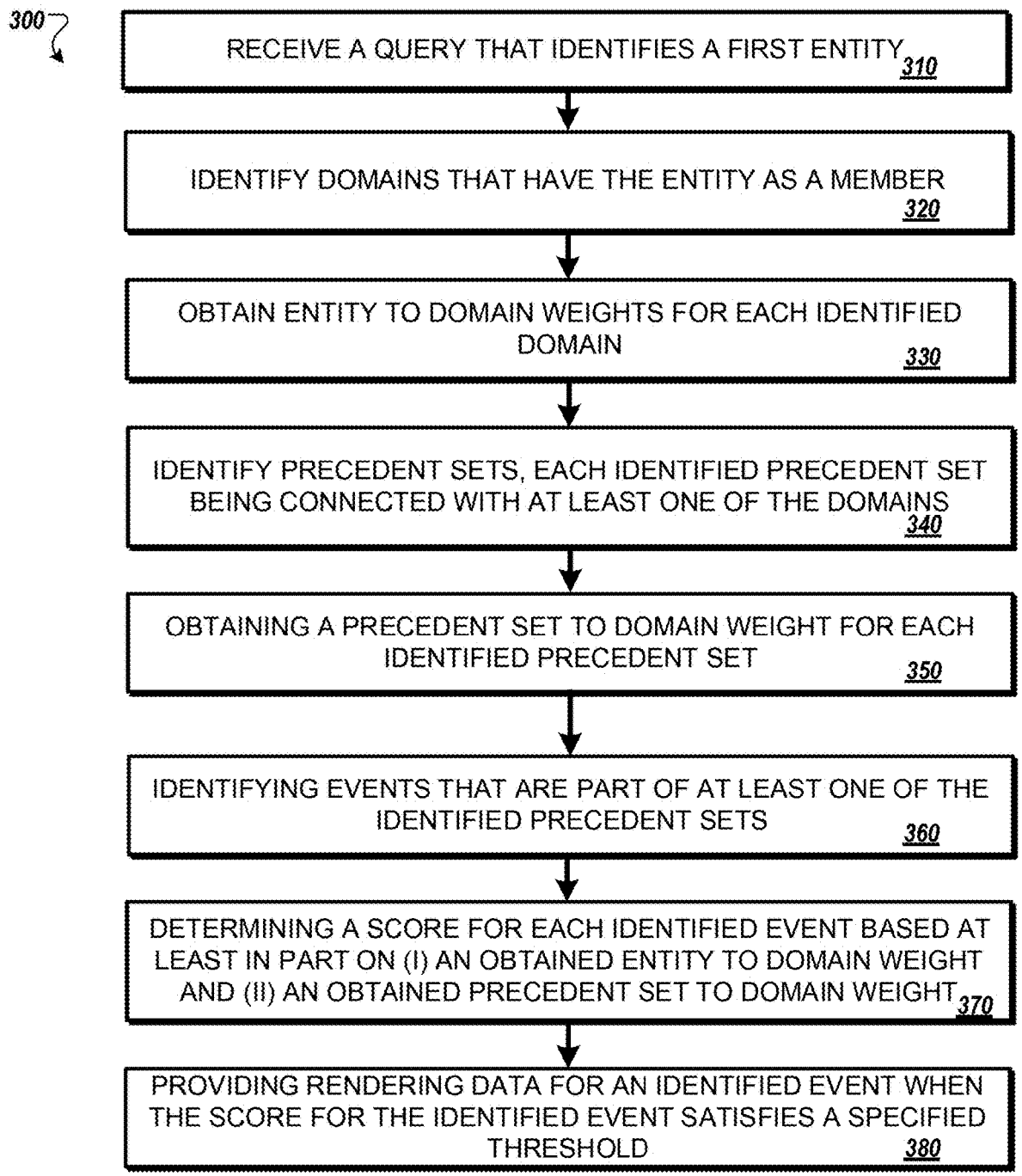
FIG. 3 is a flowchart of an example of a process for executing a search using a domain-based search system.

FIG. 3 is a flowchart of an example of a process 300 for executing a search using a domain-based search system. Generally, the process 300 includes: receiving a query that identifies an entity (310); identifying domains that have the entity as a member (320), obtaining entity-to-domain weights for each identified domain (330), identifying precedent sets, each precedent set being connected to at least one of the domains (340), obtaining a precedent set to domain weight for each identified precedent set (350), identifying events that are part of at least one of the identified precedent sets (360), determining a score for each identified event based at least in part on (i) an obtained entity-to-domain weight and (ii) an obtained precedent-set-to-domain weight (370), and providing rendering data for an identified event when the score for the identified event satisfies a specified threshold (380).

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a tablet, a smartwatch, a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor, LED (light emitting diode) monitor, OLED (organic light emitting diode), for displaying information to the user and a keyboard and a pointing device, e.g., a mouse, trackball, or touchscreen, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A system comprising:
   one or more computers and one or more storage devices on which are stored instructions that are operable, when executed by the one or more computers, to cause the one or more computers to perform operations comprising:
   receiving a query that identifies an entity;
   identifying a domain that has the entity as a member;
   obtaining an entity-to-domain weight;
   identifying a precedent set connected to the domain;
   obtaining a precedent-set-to-domain weight;
   identifying an event in the precedent set;
   determining a score for the event based at least in part on (i) the entity to domain weight and (ii) the precedent set to domain weight; and
   providing rendering data for the event when the score satisfies a specified threshold.

2. The system of claim 1, wherein identifying a domain comprises identifying a plurality of domains that each have the entity as a member and wherein identifying a precedent set connected to the domain comprises identifying a plurality of precedent sets each connected to at least one of the plurality of domains.

3. The system of claim 1, wherein the entity is a first entity and the operations further comprise:
   identifying a second entity that is associated with the event; and
   providing second entity identification information for display.

4. The system of claim 3, wherein the second entity identification information includes an indication of an impact of the event on at least one of the first and second entity.

5. The system of claim 1, wherein identifying an event in the precedent set comprises identifying an event in the precedent set where the event has occurred within a specified time period.

6. The system of claim 5, wherein the specified time period is a time period within a most recent single digit number of days.

7. The system of claim 1, wherein receiving a query that identifies an entity comprises receiving a query that identifies a non-human entity.

8. The system of claim 1, wherein providing rendering data for the event when the score satisfies a first specified threshold comprises providing rendering data for a selectable link associated with the event and wherein the operations further comprise receiving a selection of the selectable link; and in response to receiving the selection, providing rendering data that is indicative of an impact of the event.

9. A computer implemented method comprising:
   receiving a query that identifies an entity;
   identifying a domain that has the entity as a member;
   obtaining an entity-to-domain weight;
   identifying a precedent set connected to the domain;
   obtaining a precedent-set-to-domain weight;
   identifying an event in the precedent set;
   determining a score for the event based at least in part on (i) the entity to domain weight and (ii) the precedent set to domain weight; and
   providing rendering data for the event when the score satisfies a specified threshold.

10. The method of claim 9, wherein identifying a domain comprises identifying a plurality of domains that each have the entity as a member and wherein identifying a precedent set connected to the domain comprises identifying a plurality of precedent sets each connected to at least one of the plurality of domains.

11. The method of claim 9, wherein the entity is a first entity and the method further comprises:
    identifying a second entity that is associated with the event; and
    providing second entity identification information for display.

12. The method of claim 11, wherein the second entity identification information includes an indication of an impact of the event on at least one of the first and second entity.

13. The method of claim 9, wherein identifying an event in the precedent set comprises identifying an event in the precedent set where the event has occurred within a specified time period.

14. The method of claim 13, wherein the specified time period is a time period within a most recent single digit number of days.

15. The method of claim 9, wherein receiving a query that identifies an entity comprises receiving a query that identifies a non-human entity.

16. The method of claim 9, wherein providing rendering data for the event when the score satisfies a first specified threshold comprises providing rendering data for a selectable link associated with the event and wherein the method further comprises receiving a selection of the selectable link; and in response to receiving the selection, providing rendering data that is indicative of an impact of the event.

17. The method of claim 9, wherein identifying a domain that has the entity as a member comprises:
identifying a domain that has an entity-to-domain weight that satisfies a second predetermined threshold.

18. A computer implemented method comprising:
receiving a query that identifies an entity;
identifying domains that have the entity as a member;
obtaining entity-to-domain weights for each identified domain;
identifying precedent sets, each identified precedent set being connected with at least one of the domains;
obtaining a precedent-set-to-domain weight for each identified precedent set;
identifying events that are part of at least one of the identified precedent sets;
determining a score for each identified event based at least in part on (i) an obtained entity to domain weight and (ii) an obtained precedent set to domain weight; and
providing rendering data for an identified event when the score for the identified event satisfies a specified threshold.

19. The method of claim 18, wherein the entity is a first entity and the method further comprises:
identifying a second entity that is associated with an identified domain; and
providing second entity identification information for display.

20. The method of claim 19, wherein the second entity identification information includes an indication of an impact of the event on the second entity.

* * * * *